(12) United States Patent
MacPhee

(10) Patent No.: US 10,811,680 B2
(45) Date of Patent: Oct. 20, 2020

(54) BATTERY

(71) Applicant: Enocell Limited, Newhouse (GB)

(72) Inventor: Donald MacPhee, Newhouse (GB)

(73) Assignee: Enocell Limited, Newhouse (GB)

( * ) Notice: Subject to any disclaimer, the term of this patent is extended or adjusted under 35 U.S.C. 154(b) by 50 days.

(21) Appl. No.: 15/321,248

(22) PCT Filed: Jul. 6, 2015

(86) PCT No.: PCT/GB2015/051955
§ 371 (c)(1),
(2) Date: Dec. 22, 2016

(87) PCT Pub. No.: WO2016/001692
PCT Pub. Date: Jan. 7, 2016

(65) Prior Publication Data
US 2017/0162871 A1    Jun. 8, 2017

(30) Foreign Application Priority Data

Jul. 4, 2014 (GB) .................................. 1411985.3

(51) Int. Cl.
| | | |
|---|---|---|
| H01M 4/48 | (2010.01) | |
| H01M 10/36 | (2010.01) | |
| H01G 11/06 | (2013.01) | |
| H01M 10/052 | (2010.01) | |
| H01M 10/04 | (2006.01) | |
| H01M 10/058 | (2010.01) | |
| H01M 10/38 | (2006.01) | |

(52) U.S. Cl.
CPC .............. *H01M 4/48* (2013.01); *H01G 11/06* (2013.01); *H01M 10/049* (2013.01); *H01M 10/052* (2013.01); *H01M 10/058* (2013.01); *H01M 10/36* (2013.01); *H01M 10/38* (2013.01); *Y02E 60/13* (2013.01)

(58) Field of Classification Search
CPC ....................................................... H01M 4/48
See application file for complete search history.

(56) References Cited

U.S. PATENT DOCUMENTS

| 4,977,007 | A | * | 12/1990 | Kondo | .................. | G02F 1/1525 |
|---|---|---|---|---|---|---|
| | | | | | | 264/104 |
| 2006/0257716 | A1 | * | 11/2006 | Christian | ................. | B01J 21/18 |
| | | | | | | 429/482 |
| 2008/0131773 | A1 | | 6/2008 | Lucas et al. | | |
| 2009/0253025 | A1 | | 10/2009 | Whitacre | | |
| 2011/0255214 | A1 | * | 10/2011 | Gruner | .................. | B82Y 30/00 |
| | | | | | | 361/502 |
| 2013/0183589 | A1 | | 7/2013 | Minamida et al. | | |
| 2016/0336622 | A1 | * | 11/2016 | Zhang | ................... | H01M 4/583 |

FOREIGN PATENT DOCUMENTS

| EP | 0260679 A2 | 3/1988 |
|---|---|---|
| WO | 2016/001692 A1 | 10/2015 |

OTHER PUBLICATIONS

Nam K W et al: "Novel concept of pseudocapacitor using stabilized lithium metal powder and non-lithiated metal oxide electrodes in organic electrolyte", Electrochemistry Communications, Elsevier, Amsterdam, NL, vol. 11, No. 6, Jun. 1, 2009 (Jun. 1, 2009), pp. 1166-1169, XP026157820, ISSN: 1388-2481, DOI: 10.1016/J. ELECOM.2009.03.038 [retrieved on Apr. 2, 2009].

* cited by examiner

*Primary Examiner* — Jonathan G Leong
(74) *Attorney, Agent, or Firm* — Dorton & Willis, LLP; Ryan Willis

(57) ABSTRACT

A battery comprises electrodes formed from the same metal oxide and an electrolyte solution comprising a source of cations which can be intercalated into the metal oxide. The battery can store electrical charge by connecting one of the electrodes to an external power source to reduce at least some of the metal atoms in the metal oxide forming the electrode from a higher to a lower oxidation state through the uptake of intercalating cations from the electrolyte and thereby create a potential difference between the electrodes, which electrical charge can be discharged by electrically connecting the electrodes. The electrodes are preferably formed from a multi-valent transition metal oxide, such as a tungsten, vanadium, cobalt or molybdenum oxide, more preferably tungsten trioxide. The intercalating cations are preferably protons and the electrolyte an acid.

16 Claims, No Drawings

BATTERY

The present invention relates to a battery for storing and discharging electrical charge.

Lithium-ion batteries have been known for a number of years and have three principle components: positive and negative electrodes (anode and cathode respectively), and an electrolyte. The negative electrode is typically made from carbon (graphite), the positive electrode is typically made from a lithium containing oxide (e.g. lithium cobalt oxide or lithium manganese dioxide), and the electrolyte is typically a mixture of organic carbonates containing complexes of lithium ions (e.g. lithium hexafluorophosphate, lithium perchlorate, lithium tetrafluoroborate). Lithium-ion batteries are based upon an electrochemical reaction in which lithium ions move between and are incorporated into the battery electrodes. Thus, when a lithium-ion battery is discharging, $Li^+$ ions move from the negative electrode and enter the positive electrode. When the battery is charging, the reverse occurs. Work is performed when the electrons generated flow through a closed circuit.

Thus, the following chemical reactions take place (x representing the moles of $Li^+$ being transferred, and M a transition metal, such as Co or Mn):

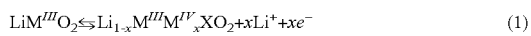

$$LiM^{III}O_2 \leftrightharpoons Li_{1-x}M^{III}_{1-x}M^{IV}_x XO_2 + xLi^+ + xe^- \quad (1)$$

$$xLi^+ + xe^- + xC \leftrightharpoons xLiC \quad (2)$$

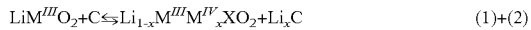

$$LiM^{III}O_2 + C \leftrightharpoons Li_{1-x}M^{III}_{1-x}M^{IV}_x XO_2 + Li_xC \quad (1)+(2)$$

The reactions from left to right represent the battery charging, and from right to left discharging. The transition metal is thus oxidised (e.g. from $Co^{3+}$ to $Co^{4+}$) during charging of the battery, and reduced during discharging.

The present invention seeks to provide an improved battery which stores and discharges electrical charge according to redox reactions of metal atoms in the electrodes.

Thus, according to the present invention there is provided a battery comprising electrodes formed from the same metal oxide and an electrolyte solution comprising a source of cations which can be intercalated into the metal oxide, wherein the battery can store electrical charge by connecting one of the electrodes to an external power source to reduce at least some of the metal atoms in the metal oxide forming the electrode from a higher to a lower oxidation state through the uptake of intercalating cations from the electrolyte and thereby create a potential difference between the electrodes, which electrical charge can be discharged by electrically connecting the electrodes.

The battery of the present invention thus has similarities to a concentration cell. A concentration cell is a type of galvanic electrolytic cell comprising two equivalent half-cells having the same electrodes and electrolytes, but differing in electrolyte solution concentrations. The cell acts to dilute the more concentrated solution, and concentrate the more dilute solution, creating a voltage as the cell reaches equilibrium. This is achieved by electrons transferring from the cell with the lower concentration to the cell with the higher concentration.

The standard electrode potential of a concentration cell is zero because the electrodes are identical. However, a potential difference between the two half-cells exists because of the difference in concentrations of the electrolyte solution concentrations.

The battery of the present invention is based upon the principles of a concentration cell, but wherein a potential difference between the electrodes is created by changing the oxidation state of one of the (solid-state) electrodes itself, rather than due to a difference in concentration of electrolyte solutions.

Initially, the electrodes of the battery of the present invention are in the same oxidation state and the cell potential is zero volts. Charging the battery by connecting one of the electrodes to an external supply induces changes in the oxidation state of metal atoms in that electrode through the uptake of intercalating cations from the electrolyte, thus creating a potential difference between the electrodes, so that current can flow between the electrodes by electrically connecting the electrodes across a load.

The battery of the present invention has the advantages that the electrodes are manufactured in the same way from the same materials and are only differentiated on charging the battery, that a simple acid electrolyte can be used, and no fragile proton-conducting membrane is required.

The battery of the present invention comprises electrodes formed from the same metal oxide, in which the metal can be present in a plurality of oxidation states. Suitable materials are thus multi-valent transition metal oxide systems which can display more than one oxidation state simultaneously and intercalate the intercalating cations. Transition metals whose oxides might thus be suitable for use in the present invention include, for example, tungsten, vanadium, cobalt and molybdenum.

A preferred metal oxide for forming the electrodes is tungsten trioxide ($WO_3$). Tungsten exhibits a range of oxidation states from +6 to −2. In $WO_3$, tungsten is in its highest oxidation state of +6 ($W^{VI}$).

Tungsten trioxide forms the basis of tungsten bronzes. These are nonstoichiometric substances of the general formula $M^1_n WO_3$ where $0<n\leq 1$ and M is most commonly sodium ($Na^+$). In tungsten bronzes tungsten is present in a mixture of +5 and +6 oxidation states, so that compounds of the formula $M^1_n WO_3$ contain (1-n) tungsten (VI) and n tungsten (V) atoms (i.e. $M^1_n W^V_n W^{VI}_{(1-n)} O_3$).

In preferred embodiments of the battery of the present invention, the electrodes can form tungsten bronze-type materials through the uptake of intercalating cations from the electrolyte when connected to an external power source, reducing the oxidation state of some of the tungsten atoms in $WO_3$ from +6 to +5. Thus:

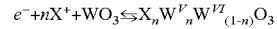

$$e^- + nX^+ + WO_3 \leftrightharpoons X_n W^V_n W^{VI}_{(1-n)} O_3$$

wherein X is the intercalating cation, and n is the number of moles of the intercalating cation being incorporated into the tungsten oxide.

Whilst a preferred metal oxide for forming the electrodes is $WO_3$, other bronze-forming materials and similar materials having the same effect may be used. For example, molybdenum forms bronzes having the generic formula $A_x Mo_y O_z$, where A may be an alkali metal or hydrogen ($H_x Mo_y O_3$), and vanadium forms bronzes with alkali metals of the generic formula $A_x V_2 O_5$, where A is sodium ($Na^+$).

The electrodes are preferably fabricated to maximise their surface area whilst retaining good electronic conductivity. The efficiency of the battery of the present invention depends upon the available surface area of the electrodes for cation transfer between the electrolyte and the electrode.

For example, $WO_3$ crystalline whiskers can be formed by passing argon/$H_2O$ vapour over a tungsten coil at 1000-1200° C. Another route involves heating a mixture of tungsten metal and silica at 1000-1200° C. in an argon atmosphere. The generation of hollow fibres of crystalline $W_{18}O_{49}$ in "pine-tree" arrays can be achieved by oxidation of $WS_2$ in an oxygen/argon atmosphere. The hollow fibres have an outer diameter of approximately 3-10 µm and are approximately 0.1-2 mm in length. High surface area $WO_3$ nanowire networks may be prepared by the thermal evaporation of tungsten powders at 1400-1450° C. in the presence of oxygen. Analogous methods will be applicable for other bronze systems.

The battery of the present invention comprises an electrolyte solution comprising a source of cations which can be intercalated into the metal oxide. The intercalating cations are preferably protons ($H^+$), but could be other suitable cations, such as lithium ($Li^+$) electrolytes suitable for use in lithium-ion batteries.

Protons are preferred as the intercalating cations, since this allows for the electrolyte to be an acid, preferably an easily dissociating (strong) acid. A preferred acid is sulphuric acid, but other strong acids may be used such as hydrochloric acid, nitric acid and organic acids, such as carboxylic and sulphonic acids. As sources of lithium ions, lithium salts, such as $LiPF_6$, $LiBF_4$ or $LiClO_4$, in an organic solvent, such as ethylene carbonate, dimethyl carbonate and diethyl carbonate, may be used.

In operation, to charge the battery the electrodes are suspended in the electrolyte, one of the electrodes is polarised to zero potential, and the other electrode is connected to an external power source and reduced. Thus, in preferred embodiments in which the electrodes are formed from $WO_3$, tungsten bronze-type materials are formed having the formula $H_n W^V_n W^{VI}_{(1-n)} O_3$ in which the value of n is increased by uptake of protons from the electrolyte. This increases the electrical potential between the electrodes, and short-circuiting the electrodes across a load enables the flow of current, with a power equivalent to the instantaneous cell voltage and current.

The capacity of the battery of the present invention depends upon the amount of cation uptake into the metal oxide. The charge stored can be illustrated in cyclic voltammograms. For example, Jayaraman, S. et al, *J. Phys. Chem. B* 2005, 109, 22958-66 reports that for pure $WO_3$ in 0.5M $H_2SO_4$, electrochemical current is observed in the potential region 0-0.55V (vs RHE) and is featureless above 0.55V with zero current, the current corresponding to the process of intercalation/deintercalation of protons into $WO_3$ to form tungsten bronzes. The area under curve represents the amount of charge stored.

The invention claimed is:

1. A battery comprising electrodes consisting of the same metal oxide and an electrolyte solution comprising a source of cations configured to be intercalated into the metal oxide, wherein the electrodes are in the same oxidation state when the battery potential is zero, and wherein the battery is configured to store electrical charge by connecting one of the electrodes to an external power source to reduce at least some of the metal atoms in the metal oxide forming the electrode from a higher to a lower oxidation state through the uptake of intercalating cations from the electrolyte and thereby create a potential difference between the electrodes, where the electrodes are configured to discharge the electrical charge by electrically connecting the electrodes across a load.

2. A battery according to claim 1 wherein the electrodes are formed from a multi-valent transition metal oxide.

3. A battery according to claim 2 wherein the transition metal is selected tungsten, vanadium, cobalt and molybdenum.

4. A battery according to claim 3 wherein the metal oxide for forming the electrodes is tungsten trioxide.

5. A battery according to claim 4 wherein the tungsten trioxide forms tungsten bronzes through the uptake of intercalating cations from the electrolyte.

6. A battery according to claim 1 wherein the intercalating cations are protons or lithium ions.

7. A battery according to claim 6 wherein the intercalating cations are protons and the electrolyte is an acid.

8. A battery according to claim 7 wherein the acid is selected from the group consisting of sulphuric acid, hydrochloric acid, nitric acid and organic acids.

9. A battery configured for storing and discharging electrical charge, the battery comprising:
   electrodes consisting of the same metal oxide, and
   an electrolyte solution comprising a source of cations intercalated into the metal oxide of at least one of the electrodes thereby creating a potential difference between the electrodes in a charged state,
   wherein when the battery is in a discharged state, the electrodes are in the same oxidation state and the battery potential is zero,
   wherein when the battery is in the charged state, the electrodes are in different oxidation states configured to create the potential difference between the electrodes, and
   wherein the at least one of the electrodes is connectable to an external power source to reduce at least some of the metal atoms in the metal oxide from a higher to a lower oxidation state through the uptake of intercalating cations from the electrolyte.

10. A battery according to claim 9 wherein the electrodes are formed from a multi-valent transition metal oxide.

11. A battery according to claim 10 wherein the transition metal is selected from the group consisting of: tungsten, vanadium, cobalt and molybdenum.

12. A battery according to claim 11 wherein the metal oxide for forming the electrodes is tungsten trioxide.

13. A battery according to claim 12 wherein the tungsten trioxide forms tungsten bronzes through the uptake of intercalating cations from the electrolyte.

14. A battery according to claim 9 wherein the intercalating cations are protons or lithium ions.

15. A battery according to claim 14 wherein the intercalating cations are protons and the electrolyte is an acid.

16. A battery according to claim 15 wherein the acid is selected from the group consisting of sulphuric acid, hydrochloric acid, nitric acid and organic acids.

\* \* \* \* \*